(12) United States Patent
Patel

(10) Patent No.: US 12,135,236 B2
(45) Date of Patent: Nov. 5, 2024

(54) VEHICLE RAIN SENSING USING MODULATED INFRARED TRANSMISSION

(71) Applicant: GM Global Technology Operations LLC, Detroit, MI (US)

(72) Inventor: Vipul M. Patel, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 267 days.

(21) Appl. No.: 17/696,994

(22) Filed: Mar. 17, 2022

(65) Prior Publication Data
US 2023/0296431 A1 Sep. 21, 2023

(51) Int. Cl.
*G01J 1/42* (2006.01)
*B60S 1/08* (2006.01)

(52) U.S. Cl.
CPC .............. *G01J 1/42* (2013.01); *B60S 1/0833* (2013.01); *B60S 1/0837* (2013.01); *G01J 2001/4242* (2013.01)

(58) Field of Classification Search
CPC ... G01J 1/42; G01J 2001/4242; B60S 1/0833; B60S 1/0837
See application file for complete search history.

(56) References Cited

U.S. PATENT DOCUMENTS

| 10,488,557 | B2 * | 11/2019 | Fesshaie | G01J 1/4228 |
| 11,457,204 | B1 * | 9/2022 | Frevert | H04N 23/80 |
| 2011/0031921 | A1 * | 2/2011 | Han | B60S 1/0837 |
| | | | | 250/351 |
| 2018/0172966 | A1 * | 6/2018 | DeMersseman | B29D 11/00009 |
| 2020/0298802 | A1 * | 9/2020 | Ketlerius | B60S 1/087 |
| 2020/0346621 | A1 * | 11/2020 | Whikehart | B60S 1/0862 |
| 2020/0397296 | A1 * | 12/2020 | Talbert | H04N 23/56 |
| 2021/0114559 | A1 * | 4/2021 | Okura | G01W 1/14 |
| 2023/0007235 | A1 * | 1/2023 | Frevert | B60S 1/56 |

OTHER PUBLICATIONS

Chi-Cheng Lai and Chih-Hung G. Li, "Video-Based Windshield Rain Detection and Wiper Control Using Holistic-View Deep Learning", 2019, IEEE 15th International Conference on Automation Science and Engineering (CASE), pp. 1060-1065 (Year: 2019).*
Kyoo Nam Choi, "Omni-directional Rain Sensor utilizing Scattered Light Reflection by Water Particle on Automotive Windshield Glass", 2011, Sensors 2011 IEEE (Year: 2011).*

* cited by examiner

*Primary Examiner* — Edmond C Lau
*Assistant Examiner* — Joshua M Carlson
(74) *Attorney, Agent, or Firm* — CANTOR COLBURN LLP

(57) ABSTRACT

A rain sensor in a vehicle includes a transmitter to implement a pseudorandom modulation of a timing of emission of infrared transmissions toward a windshield of the vehicle. The rain sensor also includes a receiver to be active for only a specified period of time following each emission of the infrared transmissions and to receive a reflection based on the infrared transmission encountering any substance on the windshield.

20 Claims, 3 Drawing Sheets

VEHICLE RAIN SENSING USING MODULATED INFRARED TRANSMISSION

INTRODUCTION

The subject disclosure relates to vehicle rain sensing using a modulated infrared transmission.

Vehicles (e.g., automobiles, construction equipment, farm equipment) increasingly use sensors to facilitate automated or semi-automated actions. For example, a radar system, lidar system, and/or camera may be used to detect objects around the vehicle and facilitated automated braking or collision avoidance or even autonomous driving. By using a sensor to detect rain droplets on the windshield, the use of windshield wipers may be automated. Accordingly, it is desirable to provide vehicle rain sensing using a modulated infrared transmission.

SUMMARY

In one exemplary embodiment, a rain sensor in a vehicle includes a transmitter to implement a pseudorandom modulation of a timing of emission of infrared transmissions toward a windshield of the vehicle. The rain sensor also includes a receiver to be active for only a specified period of time following each emission of the infrared transmissions and to receive a reflection based on the infrared transmission encountering any substance on the windshield.

In addition to one or more of the features described herein, the transmitter includes a pseudorandom generator and an infrared light source.

In addition to one or more of the features described herein, the infrared light source is triggered to output a pulse of infrared light by the pseudorandom generator.

In addition to one or more of the features described herein, the receiver is configured to provide an indication of a presence of the substance on the windshield to a controller based on receiving the reflection.

In addition to one or more of the features described herein, the receiver is configured to provide an indication of a presence of raindrops on the windshield.

In another exemplary embodiment, a system in a vehicle includes a rain sensor that includes a transmitter to implement a pseudorandom modulation of a timing of emission of infrared transmissions toward a windshield of the vehicle, and a receiver to be active for only a specified period of time following each emission of the infrared transmissions and to receive a reflection based on the infrared transmission encountering any substance on the windshield. The system also includes a controller to control activation of windshield wipers of the vehicle based on information from the receiver.

In addition to one or more of the features described herein, the transmitter includes a pseudorandom generator and an infrared light source.

In addition to one or more of the features described herein, the infrared light source is triggered to output a pulse of infrared light by the pseudorandom generator.

In addition to one or more of the features described herein, the receiver provides an indication of a presence of the substance on the windshield to the controller based on receiving the reflection.

In addition to one or more of the features described herein, the controller activates the windshield wipers based on the indication of the presence of the substance.

In addition to one or more of the features described herein, the controller activates the windshield wipers based on the indication of the presence of raindrops on the windshield.

In yet another exemplary embodiment, a method of assembling a rain sensor in a vehicle includes configuring a transmitter to implement a pseudorandom modulation of a timing of emission of infrared transmissions. The method also includes configuring a receiver to be active for only a specified period of time following each emission of the infrared transmissions.

In addition to one or more of the features described herein, the method also includes arranging the transmitter in the vehicle such that each emission is directed toward a windshield of the vehicle.

In addition to one or more of the features described herein, the method also includes co-locating the receiver with the transmitter to receive a reflection based on the infrared transmission encountering any substance on the windshield.

In addition to one or more of the features described herein, the receiver is configured to receive the reflection based on the infrared transmission encountering rain drops on the windshield.

In addition to one or more of the features described herein, the configuring the receiver includes the receiver providing an indication of a presence of the substance on the windshield to a controller based on receiving the reflection.

In addition to one or more of the features described herein, the method also includes disposing the transmitter and the receiver between a rearview mirror of the vehicle and a windshield of the vehicle.

In addition to one or more of the features described herein, the method also includes assembling the transmitter to include a pseudorandom generator and an infrared light source.

In addition to one or more of the features described herein, the method also includes configuring the infrared light source to be triggered to output a pulse of infrared light by the pseudorandom generator.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
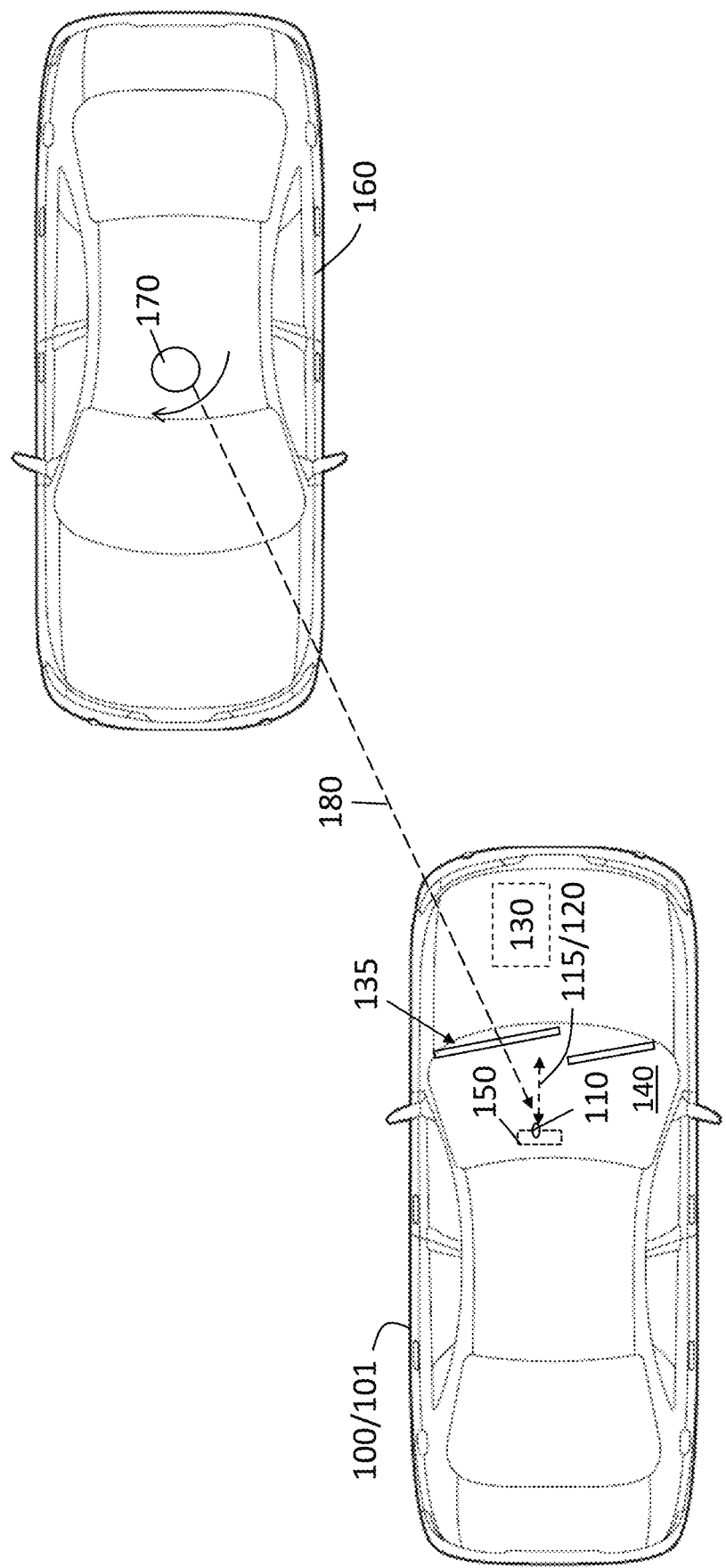
FIG. 1 is a block diagram of a vehicle that includes a rain sensor according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a rain sensor may be among the sensors that facilitate automated or semi-automated actions in a vehicle. Generally, a rain sensor provides an infrared transmission through a windshield. Any reflection of the transmission would indicate the presence of rain droplets or other particles on the windshield, because a clean windshield would be transmissive to the infrared light without generating any reflection. An indication of something on the windshield may result in automated initiation of the windshield wipers. When a given vehicle has a rain sensor and another vehicle in the vicinity of the given vehicle performs a lidar sweep, the infrared band of the lidar transmission may be mistaken as a reflection by the rain sensor of the given vehicle. This phantom reflection may result in the windshield wipers being activated unnecessarily.

Embodiments of the systems and sensors detailed herein relate to vehicle rain sensing using a modulated infrared transmission. Specifically, the receiver is only active in conjunction with a transmission of an infrared light pulse and the timing of the transmission is modulated based on a pseudorandom generator. This reduces the possibility of a temporal coincidence between the rain sensing and a sweep by a lidar system of another vehicle that would result in detection of a phantom reflection by the rain sensor.

In accordance with an exemplary embodiment, FIG. 1 is a block diagram of a vehicle 100 that includes a rain sensor 110. The exemplary vehicle 100 shown in FIG. 1 is an automobile 101. The vehicle 100 is shown with a rain sensor 110 behind the rearview mirror 150. That is, the rain sensor 110 is between the rearview mirror 150 and the windshield 140. The infrared transmission 115 from the rain sensor 110 passes through the windshield 140 when the windshield 140 is clear. When raindrops 147 (FIG. 2), debris, or any other substance 145 (FIG. 2) is on the windshield 140, it reflects some of the infrared transmission 115 as a reflection 120 back to the rain sensor 110.

A controller 130 is shown in the vehicle 100. The controller 130 may control the windshield wipers 135 of the vehicle 100 based on a reflection 120 being received by the rain sensor 110. The controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Another vehicle 160 is shown in FIG. 1. The other vehicle 160 is shown with a lidar system 170 on the roof. The lidar system 170 may be inside the windshield of the other vehicle 160 or in another location. In addition, the other vehicle 160, as well as the vehicle 100, may include additional sensors (e.g., radar system, camera). As indicated, the light transmission 180 from the lidar system 170 may be implemented as a sweep across 360 degrees. This light transmission 180 may include an infrared component.

As detailed with reference to FIG. 2, the rain sensor 110 is designed to increase the likelihood that the infrared transmission 115 will not coincide with the light transmission 180 from the lidar system 170 to the windshield 140 of the vehicle 100, as shown. In this way, the light transmission 180 is prevented from being mistaken for a reflection 120 resulting from the infrared transmission 115. By preventing such a phantom reflection, the controller 130 is prevented from activating the windshield wipers 135 when there is no substance 145 (e.g., raindrops 147, debris) on the windshield 140.

Figure 2:
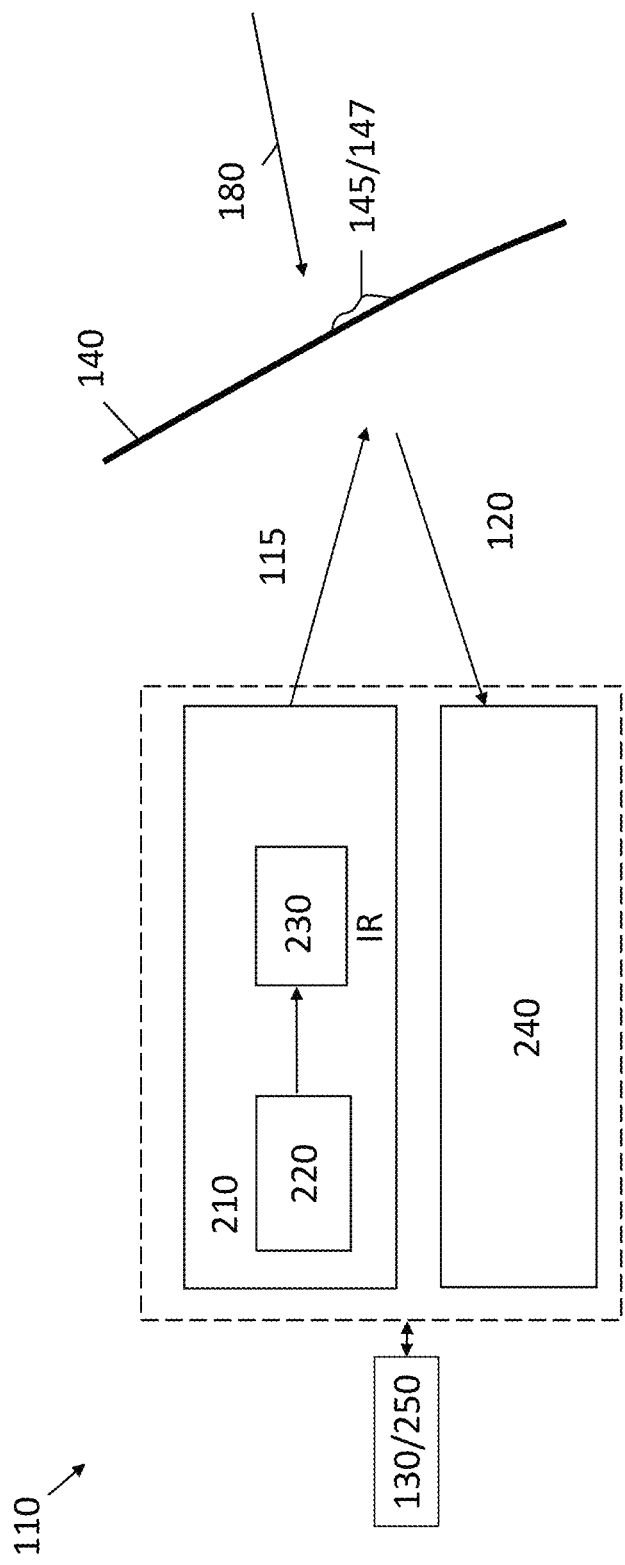
FIG. 2 is a block diagram of the rain sensor for use in a vehicle according to one or more embodiments.

FIG. 2 is a block diagram of a rain sensor 110 for use in a vehicle 100 according to one or more embodiments. The infrared transmissions 115 directed at the windshield 140 of the vehicle 100 and the reflections 120 reflected by water droplets or any substance 145 on the windshield 140 are indicated. The infrared transmissions 115 originate at a transmitter 210 of the rain sensor 110 and the reflections 120 are received by a receiver 240 of the rain sensor 110. A rain sensor controller 250, the controller 130, or a combination of the two may be coupled to the transmitter 210 and the receiver 240. The transmitter 210 may be triggered to start or end operation, for example. The receiver 240 may provide information based on the received reflection 120 (e.g., amplitude) so that the one or more controllers 130, 250 may determine whether there is something on the windshield 140 that should be cleared by activating the windshield wipers 135, for example.

The rain sensor 110 is in the vehicle 100 on one side of the windshield 140 (e.g., in the passenger cabin), as shown. A light transmission 180 is indicated on an opposite side of the windshield 140. This light transmission 180 is from a lidar system 170 of another vehicle 160 that is in the vicinity of the vehicle 100. As previously noted, this light transmission 180 may include infrared components that interfere with the rain sensor 110 by being mistaken for reflections 120 when received by the receiver 240 of the rain sensor 110. As a result, the rain sensor 110 may lead to activation of the windshield wipers 135 unnecessarily. To mitigate this possibility, the infrared transmissions 115 and receiver 240 operation are controlled, as detailed.

Figure 3:
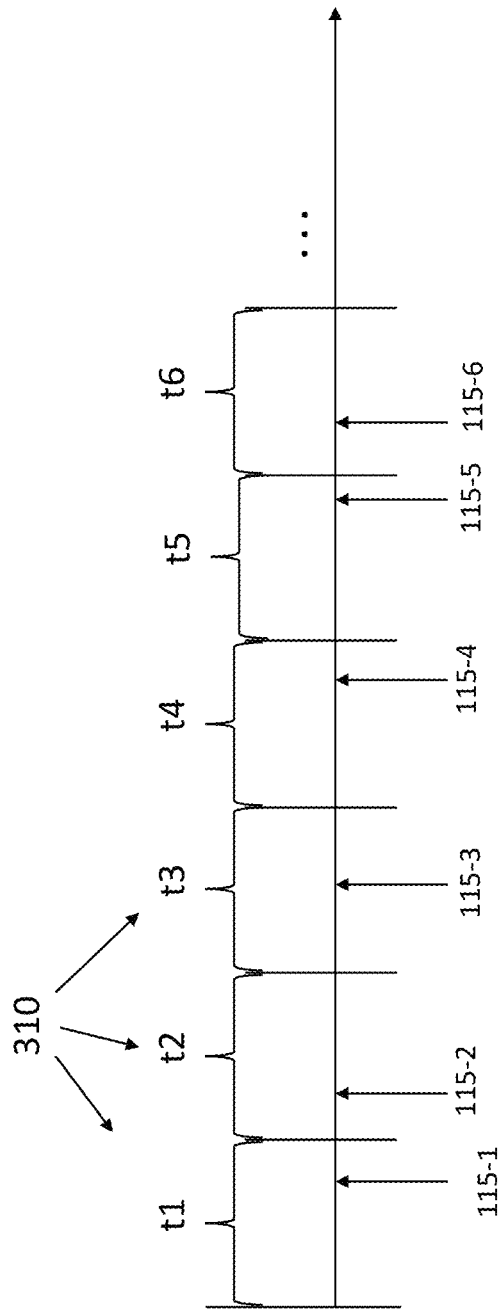
FIG. 3 shows an exemplary timeline for infrared transmissions from a rain sensor according to one or more embodiments.

The transmitter 210 of the rain sensor 110 includes an infrared light source 230 and a pseudorandom generator 220 to control the timing of an output by the infrared light source 230. This results in pulses of infrared transmission 115 with an irregular timing that is unlikely to coincide with a sweep period of the lidar system 170 of the other vehicle 160 (i.e., unlikely to coincide with the light transmission 180 directed at the vehicle 100). An exemplary timeline of the infrared transmissions 115 based on the pseudorandom generator 220 is shown in FIG. 3. The receiver 240 of the rain sensor 110 is only activated to coincide with emission of the infrared transmissions 115.

That is, based on the relatively small distance (e.g., on the order of inches) between the rain sensor 110 and the windshield 140 of the vehicle 100, a roundtrip time for an infrared transmission 115 from the transmitter 210 to reach the windshield 140 and for a reflection 120 from the windshield 140 to reach the receiver 240 is small (e.g., on the order of microseconds). Thus, the receiver 240 (e.g., photodetector) may only be turned on (i.e., activated) at or immediately after a time of emission of the infrared transmission 110 and turned off within a few microseconds of that time. Any light transmissions 180 that reach the rain sensor 110 outside that short duration are not received by the receiver 240. Thus, based on the pseudorandom timing of the infrared transmissions 115 and the fact that the receiver 240 is not active at times that are not associated with those infrared transmissions 115, the rain sensor 110 is unlikely to receive the light transmissions 180 as phantom reflections.

FIG. 3 shows an exemplary timeline for infrared transmissions 115 from a rain sensor 110 according to one or more embodiments. Six time intervals 310 t1 through t6 are shown with corresponding infrared transmissions 115-1 through 115-6. The duration of each of the time intervals 310 is the same (e.g., 1 second). The time, within each of the intervals 310, when an infrared transmission 115 is emitted is also indicated.

As FIG. 3 illustrates, each infrared transmission 115 is not emitted at the same time within the corresponding interval 310. Instead, based on the pseudorandom generator 220, the time of emission of each infrared transmission 115 within a given interval 310 is varied. The irregular (i.e., non-uniform) durations between times of the infrared transmissions 115 are unlikely to overlap with the sweep interval of the lidar system 170 of the other vehicle 160, which is most likely to be periodic.

This, coupled with the receiver 240 being active only in correspondence with the infrared transmissions 115 makes it very unlikely that the time of every infrared transmission 115 will coincide with a light transmission 180 based on a sweep duration of the lidar system 170 of the other vehicle 160. The controller 130 may only activate the windshield wipers 135 if a reflection 120 is received for a specified number of consecutive infrared transmissions 115. As a result, activation of the windshield wipers 135 based on a phantom reflection due to the light transmission 180 from another vehicle 160 may be avoided.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A rain sensor in a vehicle, comprising:
    a transmitter configured to implement a pseudorandom modulation of a timing of emission of infrared transmissions toward a windshield of the vehicle, wherein a particular time of emission of each of the infrared transmissions is varied within a given interval relative to times of emission for other of the infrared transmissions; and
    a receiver configured to be active for only a specified period of time following each emission of the infrared transmissions and to receive a reflection based on the infrared transmission encountering any substance on the windshield, wherein the receiver is activated only in correspondence with the infrared transmissions.

2. The rain sensor according to claim 1, wherein the transmitter includes a pseudorandom generator and an infrared light source.

3. The rain sensor according to claim 2, wherein the infrared light source is triggered to output a pulse of infrared light by the pseudorandom generator.

4. The rain sensor according to claim 1, wherein the receiver is configured to provide an indication of a presence of the substance on the windshield to a controller based on receiving the reflection.

5. The rain sensor according to claim 4, wherein the receiver is configured to provide an indication of a presence of raindrops on the windshield.

6. A system in a vehicle, the system comprising:
    a rain sensor comprising:
        a transmitter configured to implement a pseudorandom modulation of a timing of emission of infrared transmissions toward a windshield of the vehicle,
        a receiver configured to be active for only a specified period of time following each emission of the infrared transmissions and to receive a reflection based on the infrared transmission encountering any substance on the windshield; and
    a controller configured to control activation of windshield wipers of the vehicle based on information from the receiver, wherein the windshield wipers of the vehicle are activated responsive to reflections being received for a specified number of consecutive infrared transmissions.

7. The system according to claim 6, wherein the transmitter includes a pseudorandom generator and an infrared light source.

8. The system according to claim 7, wherein the infrared light source is triggered to output a pulse of infrared light by the pseudorandom generator.

9. The system according to claim 6, wherein the receiver is configured to provide an indication of a presence of the substance on the windshield to the controller based on receiving the reflection.

10. The system according to claim 9, wherein the controller is configured to activate the windshield wipers based on the indication of the presence of the substance.

11. The system according to claim 10, wherein the controller is configured to activate the windshield wipers based on the indication of the presence of raindrops on the windshield.

12. A method of assembling a rain sensor in a vehicle, the method comprising:
    configuring a transmitter to implement a pseudorandom modulation of a timing of emission of infrared transmissions, wherein a particular time of emission of each of the infrared transmissions is varied within a given interval relative to times of emission for other of the infrared transmissions; and
    configuring a receiver to be active for only a specified period of time following each emission of the infrared transmissions.

13. The method according to claim 12, further comprising arranging the transmitter in the vehicle such that each emission is directed toward a windshield of the vehicle.

14. The method according to claim 13, further comprising co-locating the receiver with the transmitter to receive a reflection based on the infrared transmission encountering any substance on the windshield.

15. The method according to claim 14, wherein the receiver is configured to receive the reflection based on the infrared transmission encountering rain drops on the windshield.

16. The method according to claim 12, wherein the configuring the receiver includes the receiver providing an indication of a presence of the substance on the windshield to a controller based on receiving the reflection.

17. The method according to claim 12, further comprising disposing the transmitter and the receiver between a rearview mirror of the vehicle and a windshield of the vehicle.

18. The method according to claim 12, further comprising assembling the transmitter to include a pseudorandom generator and an infrared light source.

19. The method according to claim 18, further comprising configuring the infrared light source to be triggered to output a pulse of infrared light by the pseudorandom generator.

20. The method according to claim 12, wherein the receiver is activated only in correspondence with the infrared transmissions.

* * * * *